UNITED STATES PATENT OFFICE 2,555,989

6-ALKOXY-4-METHYLHEXENE-2-DIOL-1,4 AND ESTERS THEREOF

Melvin S. Newman, Columbus, Ohio, assignor to Ohio State University Research Foundation, Columbus, Ohio, a corporation of Ohio No Drawing. Application May 10, 1947, Serial No. 747,179

14 Claims. (Cl. 260—488)

This invention relates to new compounds or compositions of matter useful as intermediates in the synthetic production of useful compounds and to processes for synthesizing such new compounds.

A specific phase of the invention is directed to alkoxy methylhexene diols and their esters, having the formula

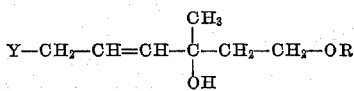

where R is a lower alkyl group and where Y may be either the hydroxyl group or an ester of the hydroxyl group.

The invention is specifically illustrated by processes of forming 6-methoxy-4-methylhexene-2-diol-1,4 and 1-acetoxy-4-hydroxy-6-methoxy-4-methylhexene-2.

Prior hereto there has been no recognized method of preparing the compounds referred to above. Nor have these compounds been previously synthesized nor isolated.

The products of this invention are of value in the further synthesis of other chemical compounds and are of particular value in syntheses leading to the preparation of vitamin A and derivatives of vitamin A. Prior to this invention, the products of this invention have not been known nor have there been any recognized methods for their preparation.

An object of this invention is the preparation of new intermediate chemical compounds useful in synthesizing vitamin A, esters thereof, similar compounds and other chemicals.

A further object is the provision of new methods of synthesizing various intermediates and other chemicals.

A further object is the provision of new alkoxy methylhexene diols and new acyloxy hydroxy alkoxy methylhexenes.

A further object of this invention is the preparation of a 6-alkoxy-4-methylhexene-2-diols-1,4.

A further object of this invention is the provision of methods for the preparation of a 6-alkoxy-4-methylhexene-2-diols-1,4.

A further object is the preparation of monoesters of a 6-alkoxy-4-methylhexene-2-diol-1,4 such as 1-acyloxy-4-hydroxy-6-alkoxy-4-methylhexene-2.

A further object is the provision of methods for the preparation of monoesters of a 6-alkoxy-4-methylhexene-2-diols-1,4.

The process of my invention may be more readily understood by reference to the following illustrative equations, R having the value given above, M representing a metal and X representing a halogen.

(1)
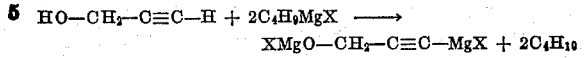

(2)
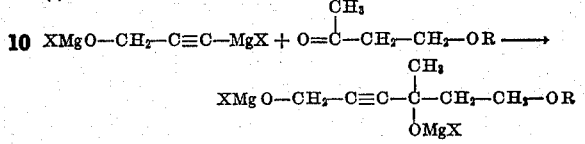

(3)
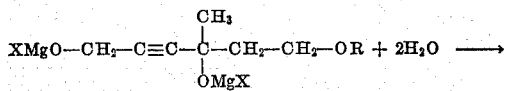

(4)

(5)
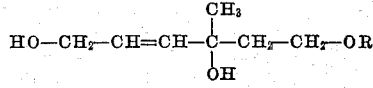

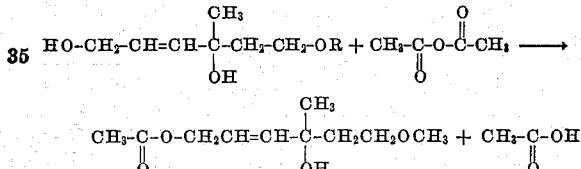

In general the process disclosed in illustration of this invention comprises the formation of an alkoxy-methylhexyne diol and the reduction thereof to an alkoxy-methylhexene diol. The alkoxy methylhexene diol may be reacted with an organic acid, acid halide or acid anhydride to give an acyloxy hydroxy alkoxy methylhexene. A satisfactory way of forming the alkoxy-methylhexene diol comprises the reaction of an organometal derivative with propargyl alcohol to form a metal derivative in which one atom of the metal replaces the hydrogen of the hydroxyl group and another replaces the acetylenic hydrogen; the reaction of the metal derivative with an alkoxy butanone to give a metal complex addition product; and the hydrolysis thereof to give the alkoxymethylhexyne diol.

Among the metals suitable for the formation of a metal derivative of propargyl alcohol are magnesium halide residues (—MgX) (as given in the above example), lithium and other alkali metals such as sodium and potassium, alkaline earth metals such as calcium and other metals. The metal derivatives of propargyl alcohol are suitably made by reacting propargyl alcohol with a suitable organo-metal derivative which will exchange the acetylenic hydrogen. As suggested above organo-metal derivatives suitable as reagents for the preparation of the propargyl metal derivatives are the Grignard reagents (R′MgX) (where R′ is a hydrocarbon derivative) as, for example, butylmagnesium chloride, butylmagnesium bromide and isopropyl magnesium chloride and metal alkyl (R′M) where M may be any of the metals mentioned above. Although the preferred reagents are magnesium reagents and phenyl and butyl lithium, it is to be understood that others are within the scope of this invention.

The hydrogen of the alcohol is also exchanged for the metal at the same time as the hydrogen on the triple bond carbon, but on reaction with the ketone, the oxygen-metal function so formed does not undergo the addition reactions as does the carbon-metal function. The metal attached to the triple bond carbon upon reaction with the butanone becomes an oxygen-metal group. Both oxygen-metal functions are converted to hydroxyl upon hydrolysis. These metalation reactions are preferably carried out in suitable solvents. For this purpose the solvent must be inert (i. e. having no replaceable hydrogen or other reactive group) and must also be anhydrous. Ethers such as diethyl ether, dibutyl ether; tetrahydrofurane; and hydrocarbons such as pentane, hexane, benzene and toluene are among the solvents which are inert and can be obtained anhydrous. Diethyl ether or a mixture of diethyl ether and tetrahydrofurane are preferred solvents in which the reaction may be conducted.

The hydrolysis of the addition complex resulting from the addition of the propargyl metal derivative and the ketone is preferably done with water. If desired, the reaction may be cooled during the hydrolysis. When water alone is used metal hydroxides and basic metal salts may precipitate which may make isolation of the product difficult. The addition of small quantities of acids such as hydrochloric, sulfuric and acetic or of inorganic salts such as ammonium salts to the water used for hydrolysis is advantageous as it renders these precipitates water soluble or otherwise easily removed. The preferred embodiment of this invention provides for the use of such an agent during hydrolysis, but of such kind and in such amount that it will not react with any of the constituents of the reaction mixture in any way so as to lead to products other than those which are an object of this invention.

The reduction of the alkoxy methylhexyne diol to the corresponding alkoxy methylhexene diol may be accomplished either chemically (such as by solution in alcohol with a zinc copper alloy) or by the use of hydrogen and a catalyst such as a supported palladium catalyst or a Raney iron catalyst.

The esterification of the hydroxyl group on carbon atom number one is accomplished by an acid or acid derivative such as an acid halide or the acid anhydride which are equivalents for the esterification of the diol. Any organic ester is within the scope of this invention. However, for ease of manipulation in subsequent reactions, esters of lower molecular weight fatty acids are preferred.

The nature of the alkoxy group (OR) on the alkoxy butanone which is condensed with the metal derivative of propargyl alcohol determines the nature of the alkoxy group in the product of this invention. The R of this group may be any hydrocarbon residue such as alkyl, cycloalkyl, aralkyl, and aryl. In the preferred embodiment of this invention, R is a lower alkyl group such as one having four carbon atoms or less. The longer chain hydrocarbons are operative but in subsequent reactions may be more difficult to handle due to higher boiling temperatures.

EXAMPLES

EXAMPLE I

*Preparation of 6-methoxy-4-methylhexyne-2-diol-1,4*

A solution of 112 g. (2 mole) of propargyl alcohol in 400 cc. of dry ether was added dropwise over three hours to 2710 cc. of a stirred solution of 1.57N (4.25 moles) butylmagnesium chloride in ether. The solution was stirred at room temperature for an additional hour and then a solution of 224 g. (2.2 moles) of 4-methoxybutanone-2 added over a period of two hours. After stirring overnight, the solution was hydrolyzed with 700 cc. of saturated ammonium chloride solution. The ether layer was separated, the solution was concentrated, and the residue distilled under reduced pressure.

The product was obtained as a yellowish oil, B. P. 122–125° C. at 1 to 2 mm.; yield=132.5 g. (42%); $n_D^{20}$=1.4744.

In addition 37 g. (33%) of propargyl alcohol (B. P. 109–111° C.) was recovered from the low boiling fractions. The structural formula of the product is:

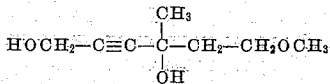

EXAMPLE II

*Preparation of 6 - methoxy - 4-methylhexene-2-diol-1,4*

In a typical experiment, 31.6 g. (0.2 mole) of 6-methoxy-4-methylhexyne-2-diol-1,4 in 100 cc. of absolute alcohol was reduced under low hydrogen pressure using 0.2 g. of a palladium on charcoal catalyst. The theoretical amount of hydrogen was taken up in four hours, and there was little noticeable reaction after this point. The catalyst was removed by filtration, the alcohol solvent removed, and the residue then distilled at reduced pressure. The desired product, obtained in almost quantitative yield, distilled at 90–92° C. under 1 mm. pressure and had an index of refraction $n_D^{20}$=1.4670. The structural formula of the product is:

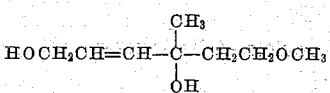

The product was characterized by forming a solid p-nitrophenyl urethan derivative by reacting 1 mole of the 6-methoxy-4-methylhexene-2-diol-1,4 with 1 mole of paranitrophenyl isocyanate to obtain the p-nitrophenyl urethan derivative according to the following reaction:

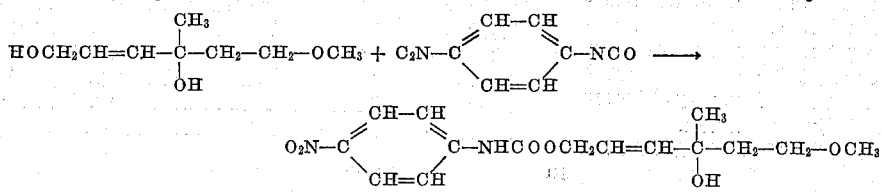

M. P. 114.6–115.4° C., and analyzed for $C_{15}H_{20}O_6N_2$ as follows:

|   | Calcd. | Found |   |
|---|---|---|---|
| C | 55.55 | 55.29, | 55.61 |
| H | 6.22 | 6.37, | 6.28 |
| N | 8.64 |  | 8.79 |

EXAMPLE III

*Preparation of "Ene-diol Acetate" (1-acetoxy-4-hydroxy-6-methoxy-4-methylhexene-2)*

A 500 ml. three-necked flask, mounted in an ice bath, was equipped with a Hershberg type stirrer, rubber stopper in one side neck, and rubber stopper bearing a calcium chloride tube in the other side neck. In the flask was placed 41 ml. (0.44 mole, 44.4 gram) of acetic anhydride. To the cold acetic anhydride was added, with stirring 58 g. (0.36 mole) of "ene-diol" (6-methoxy-4-methylhexene-2-diol - 1,4) dissolved in 87.4 ml. (1.09 mole, 85.8 gram) of anhydrous pyridine, freshly distilled from barium oxide.

Stirring was continued for twenty hours, during which period the ice melted, and the reaction proceeded at room temperature.

The solvents were then removed by distillation at 15 mm. During the distillation of the residue, illuminating gas was introduced into the Claisen flask through the capillary tube.

| Fraction | Vapor Temp. | Bath Temp. | Pressure | Weight | $n_D^{20}$ |
|---|---|---|---|---|---|
|  |  |  | Mm. | Grams |  |
| 1 | 50–90.6 | 90–109 | 1.5 | 1.3 |  |
| 2 | 90.6–95 | 109–114 | 1.5 | 25.1 | 1.4533 |
| 3 | 95–98 | 114–117 | 1.5 | 25.7 | 1.4527 |
| 4 | 98–105 | 121–126 | 1.5 | 9.6 | 1.4528 |

Since there was little difference between the refractive indices of fractions 2, 3 and 4, they were combined to give a yield of 60.4 g., 82.6% of theoretical.

Analysis:
  Calcd. for $C_{10}H_{18}O_4$: C, 59.5; H, 9.0.
  Found: C, 59.7, 59.8; H, 9.0, 9.1.

The structural formula of the product is:

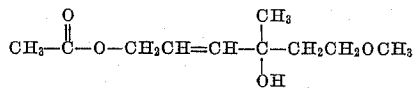

While the forms of embodiments of the present invention as herein disclosed constitute preferred forms, it is to be understod that other forms might be adopted, all coming within the scope of the claims which follow.

I claim:

1. As a composition of matter, compounds of the formula

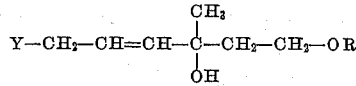

where R is a lower alkyl group and where Y is a member of the class consisting of the hydroxyl group and the fatty acid esters of the hydroxyl group in which the acid component has not more than five carbon atoms.

2. As a composition of matter, compounds of the formula

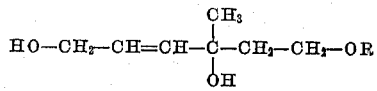

where R is a lower alkyl group.

3. As a composition of matter, compounds of the formula

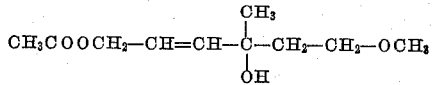

4. As a composition of matter, compounds of the formula

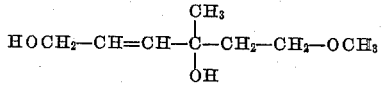

5. As a composition of matter, compounds of the formula

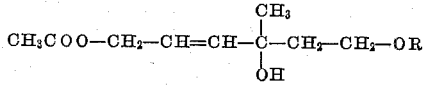

where R is a lower alkyl group.

6. As a composition of matter a fatty acid ester of a 6-lower alkoxy-4-methylhexene-2-diol-1,4 in which the acid component has not more than five carbon atoms.

7. As a composition of matter, a fatty acid ester of 6-methoxy-4-methylhexene-2-diol-1,4 in which the acid component has not more than five carbon atoms.

8. As a composition of matter 1-acetoxy-4-hydroxy-6-methoxy-4-methylhexene-2.

9. As a composition of matter a 1-carboxyl-4-hydroxy-6-alkoxy-4-methylhexene-2 in which the carboxyl is derived from a fatty acid and in which the acid component has not more than five carbon atoms.

10. In a method for the production of intermediates, the steps of condensing a propargyl metal derivative with a 1-lower alkoxy-3-butanone, hydrolyzing the reaction product, then reducing the hydrolyzed product and isolating the 6-lower alkoxy-4-methylhexene-2-diol-1,4 thus obtained.

11. In a method for the production of intermediates, the steps of condensing a propargyl metal derivative with a 1-lower alkoxy-3-butanone, hydrolzing the reaction product, then reducing the hydrolyzed product by the action of hydrogen in the presence of a supported palladium catalyst and isolating the 6-lower alkoxy-4-methylhexene-2-diol-1,4 thus obtained.

12. In a method for the production of intermediates, the step of acetylating a 6-methoxy-4-methylhexene-2-diol-1,4.

13. In a method for the production of intermediates, the step of forming a fatty acid ester of a 6-lower alkoxy-4-methylhexene-2-diol-1,4 in which the acid component has not more than five carbon atoms.

14. In a method for the production of intermediates, the steps of condensing propargyl alcohol with a lower alkoxy butanone, hydrolyzing, reducing, forming the carboxylic acid ester thereof, and isolating the 1-acyloxy-4-hydroxy-6-lower alkoxy-4-methylhexene-2 thus obtained.

MELVIN S. NEWMAN.

REFERENCES CITED

The following references are of record in the file of this patent:

UNITED STATES PATENTS

| Number | Name | Date |
|---|---|---|
| 2,253,342 | Mikeska et al. | Aug. 19, 1941 |
| 2,369,157 | Milas | Feb. 13, 1945 |
| 2,369,159 | Milas | Feb. 13, 1945 |
| 2,382,085 | Milas | Aug. 14, 1945 |
| 2,382,086 | Milas | Aug. 14, 1945 |
| 2,412,465 | Milas | Dec. 10, 1946 |

OTHER REFERENCES

Johnson, "Acetylenic Compounds," vol. 1, entitled "Acetylenic Alcohols," 1946, published by Arnold and Co., London, pages 122–124.